(No Model.)

T. H. JONES.
APPARATUS FOR PREVENTING BOILER INCRUSTATION.

No. 593,378. Patented Nov. 9, 1897.

Witnesses
Wm. F. Heming
Wm. M. Rheem

Inventor
Thomas H Jones
By Wm Johnson
Atty.

UNITED STATES PATENT OFFICE.

THOMAS H. JONES, OF CHICAGO, ILLINOIS, ASSIGNOR OF ONE-HALF TO MAURICE VON PLATEN, OF SAME PLACE.

APPARATUS FOR PREVENTING BOILER INCRUSTATION.

SPECIFICATION forming part of Letters Patent No. 593,378, dated November 9, 1897.

Application filed December 23, 1895. Renewed October 4, 1897. Serial No. 654,038. (No model.)

*To all whom it may concern:*

Be it known that I, THOMAS H. JONES, a citizen of the United States, residing at Chicago, in the county of Cook and State of Illinois, have invented certain new and useful Improvements in Apparatus for Preventing Boiler Incrustations; and I do hereby declare the following to be a full, clear, and exact description of the invention, such as will enable others skilled in the art to which it appertains to make and use the same.

This invention relates to improvements in the art or method of preventing incrustations in steam-boilers.

The invention consists substantially in subjecting the heated feed-water in its passage between the heater or source of supply and the boiler to contact with metallic mercury and zinc, whereby the water is impregnated with the mingled volatilized exhalations of the mercury, emanation and disintegration of the zinc, and which effectually prevents the carbonates and other impurities in the water from adhering to or forming incrustations within the boiler.

A practical mode of carrying out the invention is hereinafter set forth, reference being had to the accompanying drawings, in which—

Figure 1:
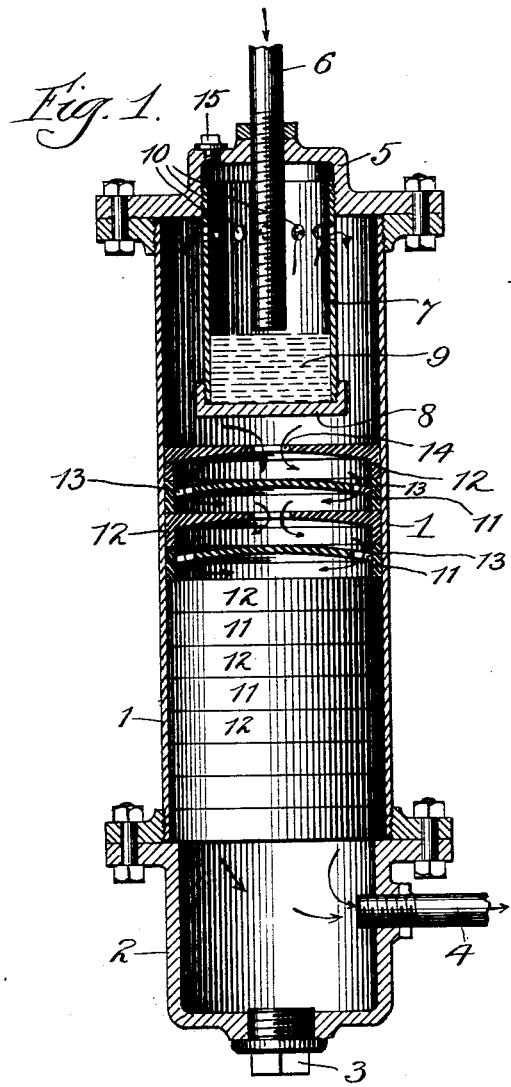
Figure 2:
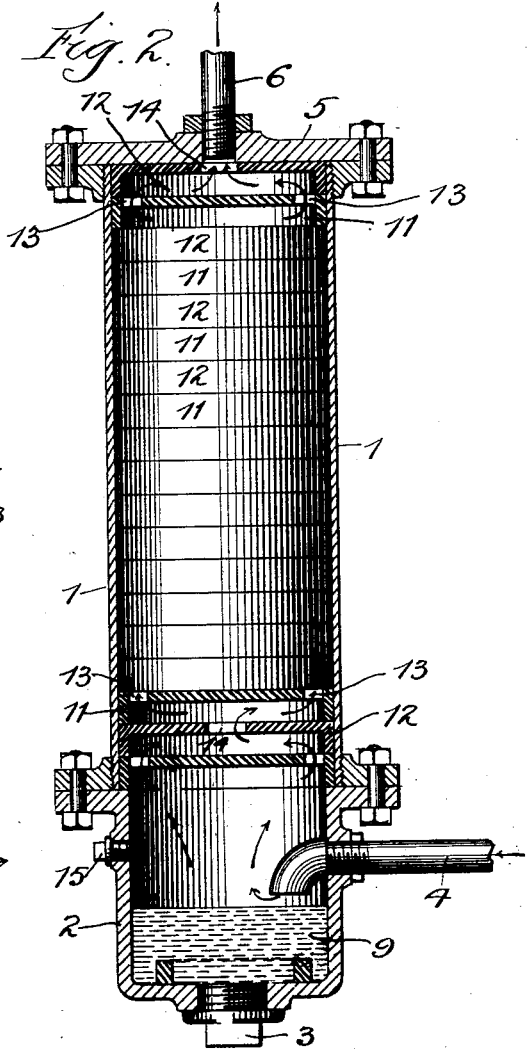
Figure 3:
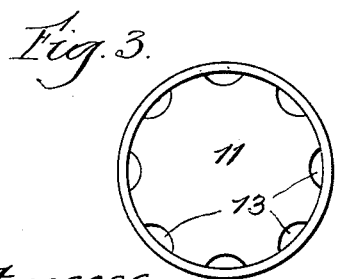
Figure 4:
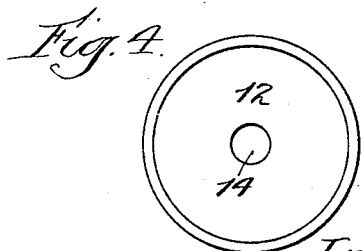

Figure 1 represents a central vertical section of an apparatus for carrying out my invention. Fig. 2 is a like view showing a modification of the same, and Figs. 3 and 4 are plan views of the zinc and amalgam castings.

Referring to the drawings, 1 designates the body or outer shell of the apparatus, formed of gas-pipe of suitable dimensions for the boiler for which it is designed. Said shell is provided with flanges at either end, screwed thereon in the usual manner.

2 is a cast-metal bonnet bolted to the lower end shell-flange and made steam-tight therewith. Said bonnet, as shown in Fig. 1, is adapted to form a mud-drum and is provided with a screw-plug 3 for removal of the accumulation therefrom.

4 is a feed-pipe screwed into the bonnet or mud-drum, connecting the apparatus with the boiler.

5 is the upper end shell-cover, into which a feed-pipe 6 is screwed, connecting the apparatus with a heater or source of supply.

7 is an inner gas-pipe shell closed at the bottom end by a cover 8, screwed thereon, the upper end being tapped into a recess upon the inside of the body shell-cover. Said inner shell forms a receptacle for the mercury 9, into which the feed-water is forced through the pipe 6 and out therefrom through the perforations or openings 10 therein, passing downward between said shells to a series of zinc and amalgam cast plates 11 and 12, through which openings 13 and 14 are arranged for the water to pass alternately through the center of one and near the circumference of the other, causing the water to move in contact with and over the surface of said plates in its passage therethrough to the boiler. Said plates are closely fitted within the outer shell and are supported upon the top of the cast bonnet, which projects within said shell for this purpose. A screw-plug 15 is tapped into an opening in the upper head through which the free mercury is replenished. Said cast water-plates are not all composed of like metal, a part of them being cast from commercially pure zinc and the other part of zinc and mercury, the proportion of each metal depending upon the character of the water to be operated upon. The union of the metals is formed by adding the mercury to the melted zinc, and is of such character that the mercury will be liberated by the gradual disintegration and decomposition of the plates from the heat and abrading action of the water thereon.

In the modified form shown in Fig. 2 the construction is identical with that described, except that the inner shell or vessel for holding the free mercury is dispensed with and the mercury is placed in the bonnet or mud-drum at the bottom, the course of the water being reversed, entering from the source of supply at the bottom instead of top and passing upward through the cast zinc and metal plates and out the top of the apparatus to the boiler, as will be readily understood.

It will be observed that the apparatus as described is adapted to be set within a heater or to become a component part of an exhaust-steam heater, if desired. It is also evident that the omission of the amalgam or composite cast plates would not affect the invention, except as to degree of results.

I claim—

1. In an apparatus for preventing incrustation in steam-boilers, the combination with a boiler and heater, of mercury and zinc, located in said apparatus between the water source of supply and the boiler, in contact with said water and over which said water must pass from said heater or source of supply to said boiler, substantially as set forth.

2. In an apparatus for preventing boiler incrustation in steam-boilers, the combination of free mercury, zinc plates or castings, and plates or castings formed of zinc and mercury, in contact with, and over which the heated feed-water is made to pass in its course from the heater or source of supply to the boiler, substantially as set forth.

In testimony whereof I affix my signature in presence of two witnesses.

THOMAS H. JONES.

Witnesses:
KITTIE CARROLL,
EMMA POWELL.